United States Patent [19]

Whightsil, Sr. et al.

[11] Patent Number: 5,133,578
[45] Date of Patent: Jul. 28, 1992

[54] FLEXIBLE JOINT WITH NON-DIFFUSIVE BARRIER

[75] Inventors: Gary L. Whightsil, Sr., Kennedale; Charles J. Moses, Alvarado, both of Tex.

[73] Assignee: LTV Energy Products Company, Garland, Tex.

[21] Appl. No.: 666,724

[22] Filed: Mar. 8, 1991

[51] Int. Cl.$^5$ .............................................. A16L 27/04
[52] U.S. Cl. ..................................... 285/166; 285/223; 285/226; 285/235; 285/900; 285/263; 277/3
[58] Field of Search .......... 285/900, 235, 95, 96g333, 285/6226, 227, 228, 166, 223, 263; 277/3; 29/451

[56] References Cited

U.S. PATENT DOCUMENTS

| | | | |
|---|---|---|---|
| 1,888,026 | 11/1932 | Chapman | 285/228 X |
| 3,023,995 | 3/1962 | Hopkins | 285/97 X |
| 3,746,372 | 7/1973 | Hynes et al. | 285/900 X |
| 3,944,263 | 3/1976 | Arnold | 285/96 |
| 4,068,868 | 1/1978 | Ohrt | 285/223 X |
| 4,523,612 | 6/1985 | Kuklo | 285/226 X |

FOREIGN PATENT DOCUMENTS

| | | | |
|---|---|---|---|
| 89459 | 9/1983 | European Pat. Off. | 285/95 |
| 534704 | 10/1931 | Fed. Rep. of Germany | 285/228 |
| 2259571 | 6/1974 | Fed. Rep. of Germany | 285/96 |
| 3146305 | 5/1985 | Fed. Rep. of Germany | 285/900 |

Primary Examiner—Dave W. Arola
Attorney, Agent, or Firm—Arnold, White & Durkee

[57] ABSTRACT

A flexible joint 13 is employed to sealingly connect a pair of tubular members 16, 18 while still permitting limited articulated movement therebetween. The flexible joint 13 includes a housing 26 with upper and lower ring-like plates 32, 34 coaxially arranged about the tubular members 16, 18. A pair of annular elastomeric bearings 40, 42 are positioned within the housing 26 and act against shoulders 44, 46 of the tubular members 16, 18 to flexibly retain the tubular members 16, 18 within the housing 26. A bellows 20 sealingly couples the tubular members 16, 18 together while permitting movement therebetween. An annular chamber 56 formed between the bellows 20 and housing 26 is filled with a fluid, such as silicon or oil. Means is provided for adjusting the volume of the chamber 56 or volume of fluid in the chamber 56 to maintain an approximately zero pressure differential across the bellows 20.

33 Claims, 5 Drawing Sheets

FLEXIBLE JOINT WITH NON-DIFFUSIVE BARRIER

BACKGROUND OF THE INVENTION

1. Technical Field

This invention is generally directed to flexible tubular joints for use in risers and pipelines and, more particularly, to a method and apparatus for sealing an end-to-end connection of a pair of tubular members while allowing limited pivotal movement therebetween.

2. Description of the Related Art

In the field of risers and pipelines used transmission of fluids, it is known to provide pivotal couplings between each of the pipe sections to allow for limited articulated movement therebetween and reduce undesirable stress. Accordingly, numerous flexible but sealed joints have been proposed for interconnecting the sections of the risers and pipelines, and these joints have been generally successful.

However, where the pipeline and/or riser is used to communicate invasive gases, such as petroleum gases and $CO_2$, the gases have a tendency to attack or saturate any rubber components used in the pivotal joint. For example, where flexible rubber links are used to seal a pivotal connection, the invasive gases are known to migrate through the rubber surface and into the body of the rubber device. If the saturated rubber is then suddenly decompressed, the gas expands and forms large pockets or blisters. This phenomena is generally referred to as "blistering due to explosive decompression."

Once the outer rubber surfaces are damaged by this "blistering," the protective cover ultimately fails and exposes the interior of the bearing to the corrosive gases. Bearings typically used in these flexible joints are commonly constructed from laminations of steel and rubber. Accordingly, the rubber laminations of the bearing are similarly affected by the invasive gases and ultimately also fail. Further, the steel laminations are corroded and ultimately also fail.

The present invention is directed to overcoming or minimizing one or more of the problems discussed above.

SUMMARY OF THE INVENTION

In one aspect of the present invention, a flexible joint is provided for sealingly coupling first and second tubular members while allowing limited articulated and axial movement therebetween. The flexible joint includes a housing adapted for receiving a first end portion of the first and second tubular members and retaining the first end portions therein. An elastomeric bearing arrangement is positioned between the housing and the first end portions of the tubular members. The elastomeric bearing arrangement is adapted for retaining the first end portions within the housing and permitting limited articulated and axial movement of the first and second tubular members. A flexible membrane is located within the housing and is sealingly coupled between the first end portions of the first and second tubular members. The flexible membrane separates first and second sealed chambers. The first sealed chamber is defined by interior surfaces of the first and second tubular members and the flexible membrane and is adapted for conveying a fluid therethrough. The second sealed chamber is defined by an interior surface of the housing and an exterior surface of the flexible membrane. The second chamber is adapted to receive a fluid therein whereby the fluid in the second chamber substantially matches the pressure of the fluid conveyed through the first chamber and produces a substantially zero pressure differential across the flexible membrane.

In another aspect of the present invention, a flexible joint is provided for sealingly coupling first and second tubular members while allowing limited articulated and axial movement therebetween. The flexible joint includes a housing adapted for receiving a first end portion of the first and second tubular members and retaining the first end portions therein. An elastomeric bearing arrangement is positioned between the housing and the first end portions of the tubular members. The elastomeric bearing arrangement is adapted for retaining the first end portions within the housing and permitting limited articulated and axial movement of the first and second tubular members. A bellows is located within the housing and is sealingly coupled between the first end portions of the first and second tubular members. The bellows separates first and second sealed chambers and has a first interior layer exposed to the first chamber and constructed from an impermeable membrane and a second layer constructed from a relatively flexible material. The first sealed chamber is defined by interior surfaces of the first and second tubular members and the bellows and is adapted for conveying a fluid therethrough. The second sealed chamber is defined by an interior surface of the housing and an exterior surface of the bellows. The second chamber is adapted to receive a fluid therein whereby the fluid in the second chamber substantially matches the pressure of the fluid conveyed through the first chamber and produces a substantially zero pressure differential across the bellows.

In yet another aspect of the present invention, a flexible joint is provided for sealingly coupling first and second tubular members while allowing limited articulated and axial movement therebetween. The flexible joint includes a housing adapted for receiving a first end portion of the first and second tubular members and retaining the first end portions therein. An elastomeric bearing arrangement is positioned between the housing and the first end portions of the tubular members. The elastomeric bearing arrangement is adapted for retaining the first end portions within the housing and permitting limited articulated and axial movement of the first and second tubular members. A bellows is located within the housing and is sealingly coupled between the first end portions of the first and second tubular members. The bellows separates first and second sealed chambers. The first sealed chamber is defined by interior surfaces of the first and second tubular members and the bellows and is adapted for conveying a fluid therethrough. The second sealed chamber is defined by an interior surface of the housing and an exterior surface of the bellows. The second chamber is adapted to receive a fluid therein whereby the fluid in the second chamber substantially matches the pressure of the fluid conveyed through the first chamber and produces a substantially zero pressure differential across the bellows. An accumulator is hydraulically coupled with the second chamber and is adapted for transferring fluid to and from the second chamber in response to a change in the volume of the second chamber.

In still another aspect of the present invention, a method is provided for assembling a flexible joint for sealingly coupling first and second tubular members while allowing limited articulated and axial movement therebetween. The method includes the steps of: inserting first end portions of the first and second tubular members into a housing; coupling a bellows between the first end portions of the first and second tubular members to isolate the interior of the tubular members from the interior of the housing; capturing the first end portions of the first and second tubular members within the housing and elastically securing the first end portions to the housing via elastomeric bearings positioned thereabout; forming a sealed chamber between the interior of the housing and exterior the bellows; and filling the sealed chamber with a fluid.

In still another aspect of the present invention, a flexible joint is provided for sealingly coupling first and second tubular members while allowing limited articulated and axial movement therebetween. The flexible joint includes a housing adapted for receiving a first end portion of the first and second tubular members and retaining the first end portions therein. An elastomeric bearing arrangement is positioned between the housing and the first end portions of the tubular members. The elastomeric bearing arrangement is adapted for retaining the first end portions within the housing and permitting limited articulated and axial movement of the first and second tubular members. A flexible membrane is located within the housing and is sealingly coupled between the first end portions of the first and second tubular members. The flexible membrane separates first and second sealed chambers. The first sealed chamber is defined by interior surfaces of the first and second tubular members and the flexible membrane and is adapted for conveying a fluid therethrough. The second sealed chamber is defined by an interior surface of the housing and an exterior surface of the flexible membrane. The second chamber is adapted to receive a fluid therein whereby the fluid in the second chamber substantially matches the pressure of the fluid conveyed through the first chamber and produces a substantially zero pressure differential across the flexible membrane. A pressure balancing assembly extends between the first and second sealed chambers and is adapted for maintaining the first and second sealed chambers at substantially similar pressures.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and will herein be described in detail. It should be understood, however, that this specification is not intended to limit the invention to the particular forms disclosed herein, but on the contrary, the intention is to cover all modifications, equivalents, and alternatives falling within the spirit and scope of the invention, as defined by the appended claims.

DESCRIPTION OF THE PREFERRED EMBODIMENTS

Figure 1:
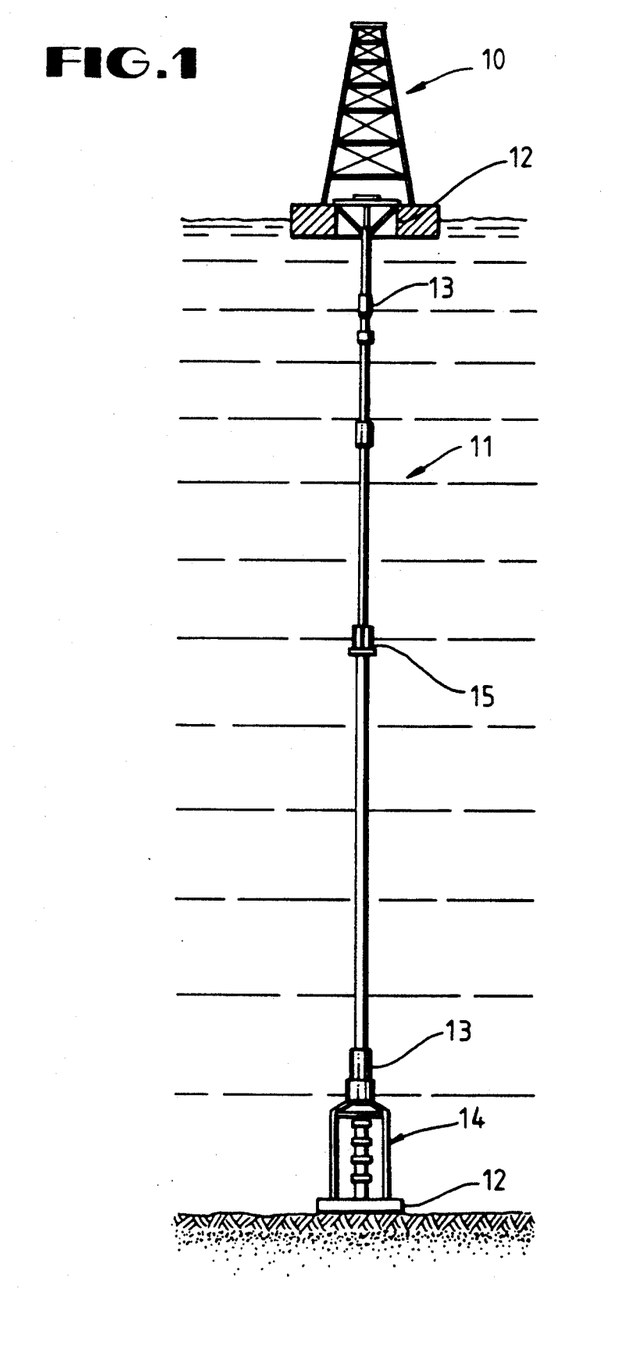
FIG. 1 illustrates a front elevational view of an off-shore drilling system that employs a riser and flexible couplings.

Referring now to the drawings and, in particular, to FIG. 1, there is shown an off-shore rig 10 with a riser assembly 11 extending between the ocean floor and the rig 10. The riser assembly 11 is anchored to the ocean floor via a base 12 extending about a wellbore or drill site. Since the riser assembly 11 is tubular in configuration, items can be passed between the rig 10 and the wellbore without contact with the ocean water. Further, the riser assembly 11 advantageously prevents intermixing of fluids in the wellbore with the ocean water.

It should be appreciated that off-shore rigs are often located in relative deep water, necessitating that the riser assembly 11 extend a relatively long distance between the rig 10 and the ocean floor. Accordingly, the riser assembly 11 is commonly constructed from a plurality of tubular segments joined together to form a generally unitary tubular element. The joints between these tubular elements are preferably sealed to prevent the intrusion of ocean water or the loss of fluids and hydrocarbons.

Further, since the rig 10 is configured to float on the surface of the water, relative movement between the rig 10 and ocean floor is to be expected. In fact, wave action can induce both axial and radial movement of the rig 10 relative to the ocean floor. Accordingly, the riser assembly 11 must necessary be constructed to accommodate both axial and radial movement.

Typically, the riser assembly 11 includes a variety of sub-system elements designed to accommodate this movement, as well as other functions. For example, the riser assembly 11 includes a pair of flexible joints 13 positioned near the top and bottom thereof. A means is provided to accommodate a substantial amount of the axial movement, while the flexible joints 13 permit radial movement, as well as limited axial movement. The lower flexible connector 13 also serves to sealingly connect a wellhead or template 14 between the base 12 and the remainder of the riser assembly 11. The upper flexible connector 13 connects a pipe extension of an axial tensioning system 12 to the remainder of the riser assembly 11 thereabove.

It should be appreciated that the riser assembly 11 is comprised of individual riser sections that are connected into the larger riser assembly 11 by a variety of connectors such as illustrated at 15. Only a single connector 15 is shown for exemplary purposes, but numerous connectors 15 may be necessary, especially when the rig 10 is located in deep water.

At least one of the critical points of the riser assembly 11, with respect to structural integrity, is at the flexible connectors 13. The flexible connectors 13 are designed to accommodate the fluid dynamics of the ocean or sea in which the rig 10 is operating and allow limited articulated movement between sections of the riser assembly 11.

Figure 2:
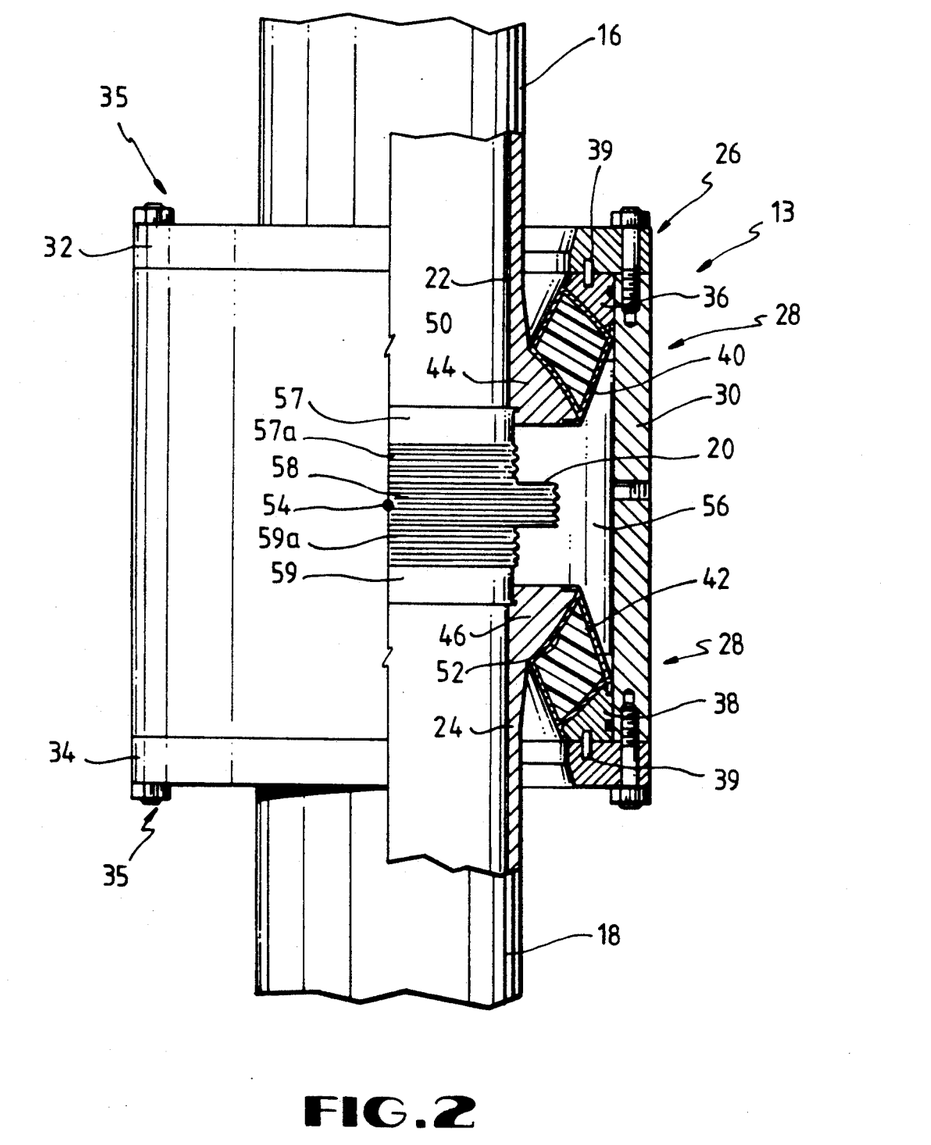
FIG. 2 illustrates a partial cross sectional view of one embodiment of a flexible coupling.

A first embodiment of an improved flexible connector 13 is illustrated in FIG. 2 in a partial cross sectional view. A pair of tubular members 16, 18 are sealingly connected together by a relatively flexible membrane, which can take a variety of forms, but in the preferred embodiment is a bellows 20. The bellows 20 and end portions 22, 24 of the tubular member 16, 18 are all contained within a housing 26. The housing 26 isolates the connection of the tubular members 16, 18 from external and environmental conditions, as well as providing a bearing arrangement 28 for supporting the tubular elements 16, 18 in relatively fixed positions.

The housing 26 includes a cylindrical sleeve 30 coaxially arranged about the tubular members 16, 18, along with top and bottom plates 32, 34, which are ring-like in configuration. The plates 32, 34 have an external diameter substantially similar to that of the cylindrical sleeve 30, and a centrally located opening (not shown) of a diameter slightly larger than the diameter of the tubular members 16, 18. The tubular members 16, 18, of course, extend through the openings in the plates 32, 34 and are restricted against removal therethrough by the bearing arrangements 28. The top and bottom plates 32, 34 are attached to the cylindrical sleeve 30 via standard nut and bolt combinations 35 extending about the top and bottom periphery of the cylindrical sleeve 30 and plates 32, 34. It should be appreciated that other means for attaching the top and bottom plates 32, 34 may be readily substituted without departing from the spirit and scope of the instant invention.

The bearing assemblies 28 are preferably coupled to the top and bottom plates 32, 34 to fix them against substantial radial and axial movement. For example, annular members 36, 38 have an external diameter slightly less than the internal diameter of the cylindrical sleeve 30. The annular members 36, 38 each have a substantially triangular cross section with one leg of the cross section abutted against and pinned by studs 39 to the top and bottom plates 32, 34, respectively. Thus, the hypotenuse of the triangular cross section provides a surface against which a bearing 40, 42 is mated. The bearings 40, 42 are conventional laminated bearings, having alternating layers of elastomeric material and steel plates (not shown) so as to allow limited radial and axial movement thereof.

The bearings 40, 42 are also annular in configuration, extending about the entire periphery of the annular members 36, 38 and contacting the hypotenuse surface of the triangular cross section of the annular members 36, 38. The opposite surface of the bearings 40, 42 mate with a shoulder 44, 46 formed on the end portions 22, 24 of the tubular members 16, 18, respectively. The shoulders 44, 46 have their external surface attached to the bearings 40, 42 so that they are generally held in an unbiased position that aligns longitudinal axes of the tubular member 16, 18. However, articulated and axial movement of the tubular members 16, 18 is accommodated by limited flexing of the elastomeric portions of the laminated bearings 40, 42.

Further, it should be appreciated that the mating surfaces of the shoulders 44, 46 with the bearings 40, 42 are arcuate in configuration. That is, interfaces 50, 52 between the shoulders 44, 46 and the bearings 40, 42 are a segment of a spherical surface which has its center point corresponding to the center point of the joint between the tubular members 16, 18, as indicated at 54. This spherical arrangement permits smoother and easier articulated movement of the tubular member 16, 18, irrespective of the direction of angular displacement.

The cylindrical sleeve 30, bearings 40, 42, and bellows 20 cooperate to define an annular cavity 56 that is isolated from both the external environment outside the housing 26 and the internal environment within the tubular member 16, 18. Preferably, the annular cavity 56 is filled with a noncompressible fluid, such as silicon or oil, which is intended to relieve stress on the flexible bellows 20 caused by pressure within the tubular member 16, 18.

The bellows 20 is preferably relatively flexible to accommodate articulated and axial movement of the tubular members 16, 18. That is, articulated movement of the tubular members 16, 18 causes the bellows to compress in the direction of the articulated movement and to expand on its opposite side thereof. The flexibility of the bellows 20 allows it to maintain its sealed connection with the tubular members 16, 18 during articulated movement therebetween. Further, the bellows 20 also accommodates axial movement of the tubular members 16, 18. For example, axial tension of the tubular members 16, 18 forces their end portions 22, 24 somewhat further apart, causing the bellows 20 to extend uniformly about its entire periphery.

It should be appreciated that articulated and axial movement of the tubular members 16, 18, which causes a change in the shape of the bellows 20 also influences the size of the cavity 56. For example, a compression load applied to the tubular members 16, 18, which causes the bellows 20 to uniformly collapse about its entire periphery, tends to increase the volumetric size of the annular cavity 56. However, since the cavity 56 is filled with a fluid intended to counteract the pressure contained within the tubular members 16, 18, means is preferably provided for adjusting the volume of the annular cavity 56 or amount of fluid within the annular cavity 56 in response to such movement of the tubular members 16, 18 so that a substantially zero pressure differential is maintained across the bellows 20.

One method for causing such a change in the volumetric capacity of the annular chamber 56 is to construct the bellows 20 of sufficiently flexible material that its deformation caused by movement of the tubular members 16, 18 is counteracted by a corresponding movement of the bellows 20 in reaction to the internal pressure in the tubular members 16, 18. That is, when movement of the tubular members 16, 18 causes the bellows 20 to be generally reduced in volume so that the annular chamber 56 is increased in volume, the pressure within the tubular member 16, 18 forces a portion of the bellows 20 to expand and maintain the annular chamber 56 at the desired, constant volume.

For example, the bellows 20 is constructed in three segments, a first end portion 57, an intermediate portion 58, and a second end portion 59. The first and second end portions 57, 59 are substantially similar to one another and have a diameter substantially similar to the diameter of the first and second tubular members 16, 18. Axial segments 57a, 59a of the first and second end portions 57, 59 are constructed in a bellows or folded configuration, which collapse or expand in response to movement between the tubular members 16, 18. The intermediate portion 58 of the bellows 20 has a diameter substantially greater than the first and second end portions, and, like the axial segments 57a, 59a is also constructed in a bellows or folded configuration. Owing to its larger diameter, the intermediate portion 58 is more flexible than the axial segments of the first and second end portions 57, 59. Accordingly, while the axial segments respond to movement of the tubular members 16, 18, the intermediate portion 20 responds to a pressure differential between the annular chamber 56 and the fluid inside the tubular members 16, 18. Accordingly, the intermediate portion 58 expands or contracts to counteract a volumetric change in the annular chamber 56 caused by a change in the first and second end portions 57, 59.

In application where the tubular members 16, 18 are used to communicate invasive gases, then, if the bellows 20 is sufficiently flexible to accommodate the above-described motion, it is ordinarily subject to the phenomena known as "blistering due to explosive decompression." Accordingly, in a preferred embodiment of the instant invention, the bellows 20 is lined with a membrane having the qualities of a non-diffusive or impermeable barrier to prevent the invasive gases from attacking the relatively flexible rubber used in the bellows 20.

Figure 3:
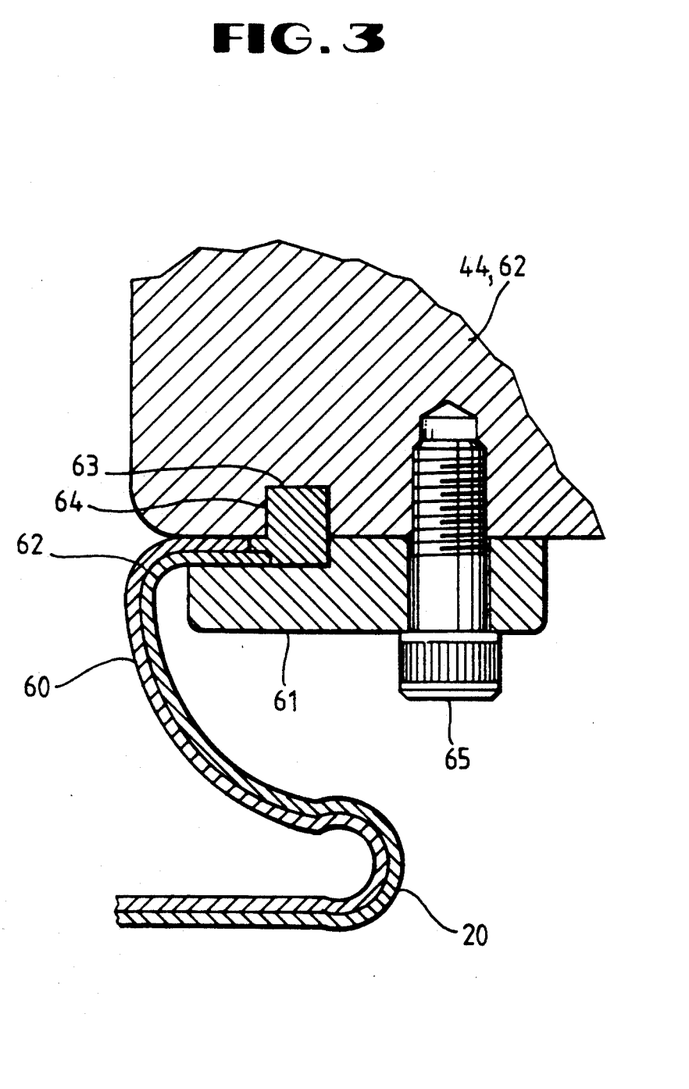
FIG. 3 illustrates a partial cross sectional view of the bellows illustrated in FIG. 2.

Referring now to FIG. 3, a cross section of the bellows 20 with a non-diffusive membrane 60 is shown in greater detail. The bellows 20, in this embodiment, is constructed in at least two layers, with the internal layer being the non-diffusive membrane 60 and the outer layer being a relatively flexible compound, such as plied rubber. In this manner, the desired flexibility of the bellows 20 is maintained while advantageously isolating the flexible rubber layer from invasive gases contained within the tubular member 16, 18.

The membrane 60 is preferably constructed from any of a variety of non-diffusive materials, such as a very thin sheet of metallic material or tinfoil. The non-diffusive membrane is intended only to prevent the invasive gas from attacking the rubber portion of the bellows 20, and, consequently, does not need to provide structural integrity to the bellows 20. Rather, durability and structural integrity of the bellows 20 is provided by the rubber layer.

To isolate the interior of the tubular members 16, 18 from the annular chamber 56, the bellows 20 is preferably sealing coupled to the tubular members 16, 18. A pair of split rings 61 are positioned on the axial end portions of the tubular members 16, 18, capturing end portions 62 of the bellows 20 between the split ring 61 and the tubular members 16, 18. Preferably, an annular groove 63 extends axially into the end portions 44, 46 of the tubular members 16, 18. A matching tab 64, formed on the end portions 62 of the bellows 20, is disposed in the annular groove 63 and retained therein by the split rings 61. The split rings 61 are coupled to the end portions 44, 46 of the tubular members 16, 18 by any conventional fastening means, but preferably by a threaded screw 65 extending therethrough and into a correspondingly threaded bore in the end portions 62.

Figure 4:
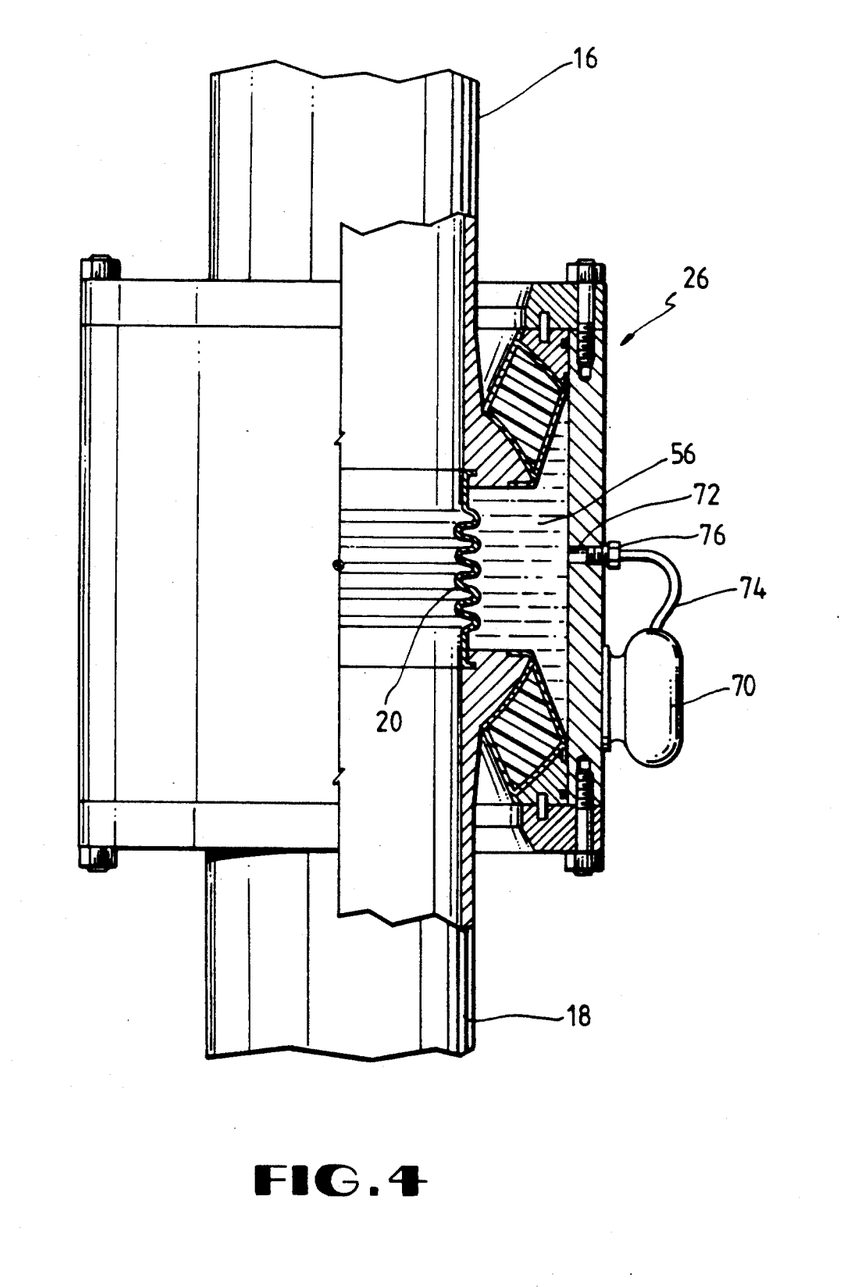
FIG. 4 illustrates a partial cross sectional view of another embodiment of a flexible coupling.

An alternative method and apparatus for maintaining the annular chamber 56 at a pressure corresponding to the pressure within the tubular members 16, 18 is described in the partial cross sectional view of an embodiment of the housing 26 shown in FIG. 4. Identical elements shown in the alternative embodiments of FIGS. 2 and 4 are indicated by like reference numerals.

FIG. 4 illustrates a similar flexible joint to that illustrated in FIG. 2. The tubular members 16, 18 are connected together within a housing 26 enclosed by top and bottom plates 32, 34 with the tubular members 16, 18 generally held in longitudinally aligned position by bearings 28 acting against the shoulders 44, 46 formed on the tubular members 16, 18. Once again, the annular chamber 56 is filled with a fluid, such as oil or silicon, acting to maintain a zero pressure differential across the bellows 20.

In this embodiment, however, the bellows 20 is constructed from an impermeable membrane, such as a metallic material, that is relatively rigid and does not flex easily. Accordingly, the bellows 20 is not readily deformable to maintain a constant volume in the annular chamber 56, as described in conjunction with the embodiment illustrated in FIG. 2.

Rather, the annular chamber 56 is hydraulically connected to an accumulator 70 mounted on an outside surface of the housing 26. The accumulator 70 is connected through an opening 72 in a side wall of the cylindrical sleeve 30 via a hydraulic line 74 and threaded coupling 76.

Accordingly, the accumulator 70 maintains the annular chamber 56 filled with the fluid, irrespective of the volumetric capacity of the annular chamber 56 at any instant in time. For example, when a compressive load is applied to the tubular members 16, 18 the bellows 20 responds by uniformly collapsing about its periphery and increasing the volume of the annular chamber 56. The accumulator 70 responds to the change in volumetric size of the annular chamber 56 by supplying additional fluid through the hydraulic line 74 and into the annular chamber 56 whereby the amount of fluid in the annular chamber 56 is supplemented in response to its additional, momentary capacity.

After the compressive load is removed from the tubular members 16, 18 and they return to their original position, the bellows 20, likewise, returns to its initial position and the volume of the annular chamber 56 is reduced to its original volume. The supplemental fluid supplied by the accumulator 70 is forced from the annular chamber 56 and through the hydraulic line 74 into the accumulator 70.

Similar exchanges of fluid between the accumulator 70 and annular chamber 56 occur in response to articulated and axial movement of the tubular members 16, 18 that influences the size of the annular chamber 56.

Figure 5:
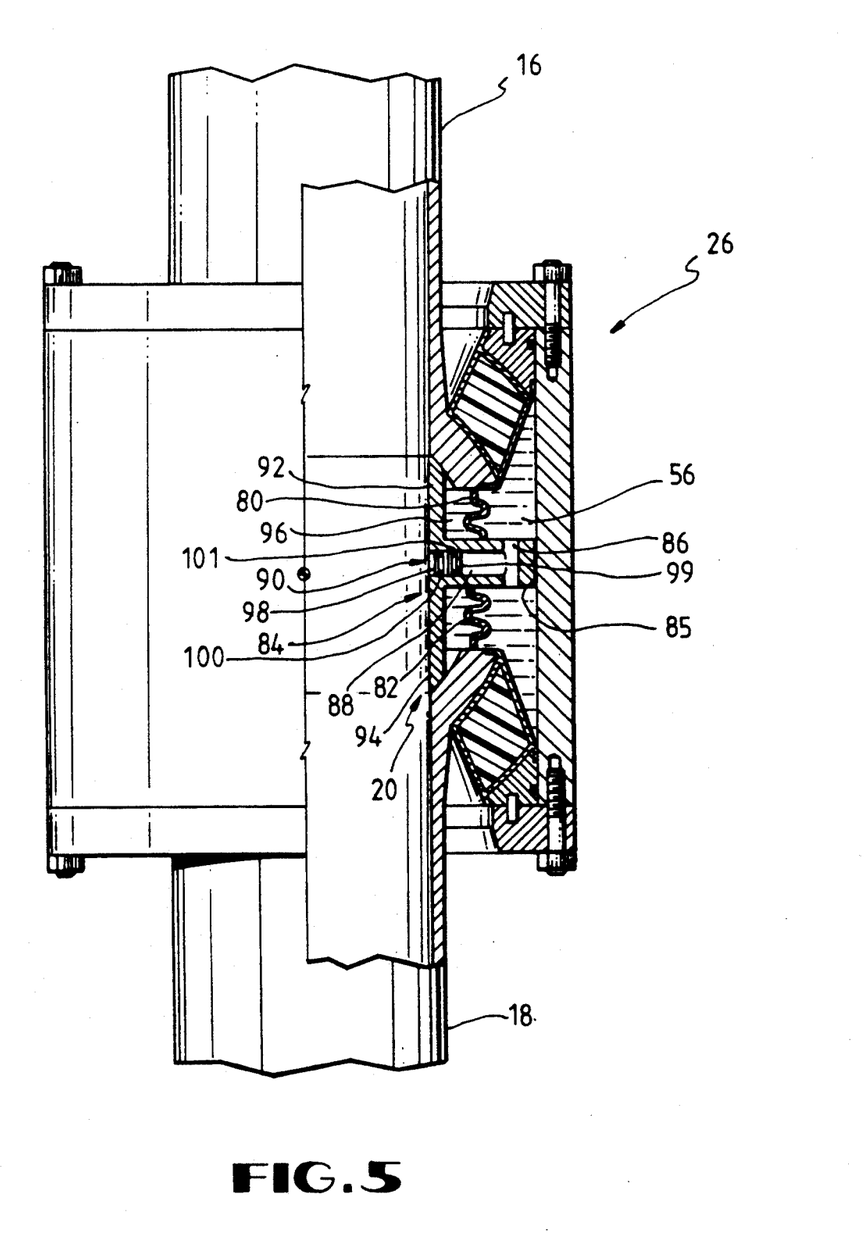
FIG. 5 illustrates a partial cross sectional view of another embodiment of a flexible coupling.

Another alternative method and apparatus for maintaining the annular chamber 56 at a pressure corresponding to the pressure within the tubular members 16, 18 is described in the partial cross sectional view of an embodiment of the housing 26 shown in FIG. 5. Identical elements shown in the alternative embodiments of FIGS. 2, 4, and 5 are indicated by like reference numerals.

FIG. 5 illustrates a similar flexible joint to that illustrated in FIG. 2. The tubular members 16, 18 are connected together within a housing 26 enclosed by top and bottom plates 32, 34 with the tubular members 16, 18 generally held in longitudinally aligned position by the bearings 28 acting against the shoulders 44, 46 formed on the tubular members 16, 18. Once again, the annular chamber 56 is filled with a fluid, such as oil or silicon, acting to maintain a zero pressure differential across the bellows 20.

In this embodiment, however, the bellows 20 is formed in two longitudinal segments 80, 82 and interrupted by a pressure balancing assembly 84. The pressure balancing assembly 84 is preferably centrally located in the housing 26 and fixed to the cylindrical sleeve 30. The pressure balancing assembly 84 generally operates to equalize the pressure within the tubular members 16, 18 and the pressure in the annular chamber 56.

A central housing 85 of the pressure balancing assembly 84 divides the annular chamber 56 into upper and lower regions hydraulically connected together by a series of bore holes 86 extending longitudinally therethrough. The bore holes 86 intersect a pressure balancing port 88, which extends into the chamber formed internal to the tubular members 16, 18. A pressure balancing piston assembly 90 prevents the exchange of fluids between the annular chamber 56 and the chamber internal to the tubular members 16, 18. The piston assembly 90 is, however, relatively free to move within the pressure balancing port 88.

Accordingly, movement of the tubular members 16, 18 that causes the bellows 20 to collapse or expand and change the volume of the annular chamber 56 also causes a change of pressure within the annular chamber 56. However, a change in pressure in the annular chamber 56 is counteracted by movement of the piston assembly 90 and effectively returns the volume of the annular chamber 56 to its original size. Accordingly, a substantially zero pressure differential is maintained across the bellows 20.

The pressure balancing assembly 84 also includes longitudinal annular protrusions 92, 94 that extend adjacent the tubular members 16, 18, but are sufficiently spaced therefrom to prevent contact therebetween during articulated and axial movement of the tubular members 16, 18. The annular protrusions limit the flow of fluid from within the tubular members 16, 18 into a cavity 96 adjacent the bellows 20. Thus, the cavity 96 and bellows 20 are somewhat isolated from minor pressure fluctuations in the tubular members 16, 18.

The piston assembly 90 is preferably constructed from a pair of pistons 98, 99 having a diameter substantially similar to the diameter of the pressure balancing port 88. Both of the pistons 98, 99 include an annular seal 100, 101 to prevent loss of fluid from, or intrusion of fluid into, the annular chamber 56. Preferably, the annular seal 101 is an elastomeric 0-ring positioned within a groove in the piston and in sealing contact with the piston 99 and the pressure balancing port 88. The annular seal 100, however, is preferably constructed from an impermeable material such as metal. An elastomeric 0-ring used to seal the piston 98 would be exposed to the invasive gases within the tubular members 16, 18 and, therefore, subject to "blistering" and eventual failure in much the same manner as the bellows 20 and elastomeric bearings 28.

Although particular detailed embodiments of the apparatus have been described herein, it should be understood that the invention is not restricted to the details of the preferred embodiment. Many changes in design, configuration, and dimensions are possible without departing from the spirit and scope of the instant invention.

We claim:

1. A flexible joint for sealingly coupling first and second tubular members while allowing limited articulated and axial movement therebetween, comprising:
   a housing adapted for receiving a first end portion of said first and second tubular members and retaining said first end portions therein;
   an elastomeric bearing arrangement coupled between an interior surface of said housing and said first end portions of said tubular members, said elastomeric bearing arrangement being adapted for retaining said first end portions within said housing and permitting limited articulated and axial movement of said first and second tubular members; and
   a flexible membrane located within said housing and sealingly coupled between said first end portions of said first and second tubular members, said flexible membrane separating first and second sealed chambers;
   said first sealed chamber being defined by interior surfaces of said first and second tubular members and said flexible membrane and being adapted for conveying a fluid therethrough; and
   said second sealed chamber being defined by an interior surface of said housing, an exterior surface of said flexible membrane, and said elastomeric bearing arrangement, said second chamber being adapted to receive a fluid therein whereby the fluid in the second chamber substantially matches the pressure of the fluid conveyed through the first chamber and produces a substantially zero pressure differential across said flexible membrane.

2. A flexible joint, as set forth in claim 1, wherein said flexible membrane takes the form of a bellows.

3. A flexible joint, as set forth in claim 2, wherein said bellows includes first and second end portions and an intermediate portion positioned therebetween, said first and second end portions having an axial region constructed in a folded configuration of a first diameter, and said intermediate portion having an axial region constructed in a folded configuration of a second diameter greater than said first diameter.

4. A flexible joint, as set forth in claim 2, wherein said bellows includes a first interior layer exposed to the first chamber and constructed from an impermeable membrane and a second layer constructed from a relatively flexible material.

5. A flexible joint, as set forth in claim 4, wherein said first interior layer is constructed from a metallic material.

6. A flexible joint, as set forth in claim 5, wherein said first interior layer is constructed from tinfoil.

7. A flexible joint, as set forth in claim 4, wherein said second layer is constructed from plied rubber.

8. A flexible joint, as set forth in claim 1, including an accumulator hydraulically coupled with said second chamber and adapted for transferring fluid to and from said second chamber in response to a change in the volume of said second chamber.

9. A flexible joint, as set forth in claim 8, wherein said bellows is constructed from a relatively rigid material.

10. A flexible joint, as set forth in claim 8, wherein said bellows is constructed from a metallic material.

11. A flexible joint, as set forth in claim 1, wherein said fluid is substantially incompressible.

12. A flexible joint, as set forth in claim 11, wherein said fluid contains oil.

13. A flexible joint, as set forth in claim 11, wherein said fluid contains silicone.

14. A flexible joint, as set forth in claim 1, including a pressure balancing assembly extending between said first and second sealed chambers and adapted for maintaining said first and second sealed chambers at substantially similar pressures.

15. A flexible joint, as set forth in claim 14, wherein said pressure balancing assembly includes a housing forming a port extending between said first and second sealed chambers, and a piston assembly positioned in said port and relatively free to move therein, said piston assembly having a first fluid engaging surface exposed to said first sealed chamber and a second fluid engaging surface exposed to said second sealed chamber, whereby a pressure differential between said first and second sealed chambers forces said piston assembly to move within said port and substantially eliminate the pressure differential.

16. A flexible joint, as set forth in claim 15, wherein said piston assembly includes a first piston exposed to said first sealed chamber, said first piston having an impermeable seal associated therewith to substantially prevent leakage of fluid from said first sealed chamber, and a second piston exposed to said second sealed chamber, said second piston having an elastomeric seal associated therewith to prevent leakage of fluid from said second sealed chamber.

17. A flexible joint for sealingly coupling first and second tubular members while allowing limited articulated and axial movement therebetween, comprising:
   a housing adapted for receiving a first end portion of said first and second tubular members and retaining said first end portions therein;
   an elastomeric bearing arrangement coupled between an interior surface of said housing and said first end portions of said tubular members, said elastomeric bearing arrangement being adapted for retaining said first end portions within said housing and permitting limited articulated and axial movement of said first and second tubular members; and
   a bellows located within said housing and sealingly coupled between said first end portions of said first and second tubular members, said bellows separating first and second sealed chambers, said bellows having a first interior layer exposed to the first chamber and constructed from an impermeable membrane and a second layer constructed from a relatively flexible material;
   said first sealed chamber being defined by interior surfaces of said first and second tubular members and said bellows and being adapted for conveying a fluid therethrough; and
   said second sealed chamber being defined by an interior surface of said housing, an exterior surface of said bellows, and said elastomeric bearing arrangement, said second chamber being adapted to receive a fluid therein whereby the fluid in the second chamber substantially matches the pressure of the fluid conveyed through the first chamber and produces a substantially zero pressure differential across said bellows.

18. A flexible joint, as set forth in claim 17, wherein said first interior layer is constructed from a metallic material.

19. A flexible joint, as set forth in claim 18, wherein said first interior layer is constructed from tinfoil.

20. A flexible joint, as set forth in claim 17, wherein said second layer is constructed from plied rubber.

21. A flexible joint, as set forth in claim 17, wherein said fluid is substantially incompressible.

22. A flexible joint, as set forth in claim 21, wherein said fluid contains oil.

23. A flexible joint, as set forth in claim 21, wherein said fluid contains silicone.

24. A flexible joint, as set forth in claim 17, wherein said bellows includes first and second end portions and an intermediate portion positioned therebetween, said first and second end portions having an axial region constructed in a folded configuration of a first diameter, and said intermediate portion having an axial region constructed in a folded configuration of a second diameter greater than said first diameter.

25. A flexible joint for sealingly coupling first and second tubular members while allowing limited articulated and axial movement therebetween, comprising:
   a housing adapted for receiving a first end portion of said first and second tubular members and retaining said first end portions therein;
   an elastomeric bearing arrangement coupled between an interior surface of said housing and said first end portions of said tubular members, said elastomeric bearing arrangement being adapted for retaining said first end portions within said housing and permitting limited articulated and axial movement of said first and second tubular members;
   a bellows located within said housing and sealingly coupled between said first end portions of said first and second tubular members, said bellows separating first and second sealed chambers;
   said first sealed chamber being defined by interior surfaces of said first and second tubular members and said bellows and being adapted for conveying a fluid therethrough; and
   said second sealed chamber being defined by an interior surface of said housing, an exterior surface of said bellows, and said elastomeric bearing arrangement, said second chamber being adapted to receive a fluid therein whereby the fluid conveyed through the first chamber and produces a substantially zero pressure differential across said bellows; and
   an accumulator hydraulically coupled with said second chamber and adapted for transferring fluid to and from said second chamber in response to a change in the volume of said second chamber.

26. A flexible joint, as set forth in claim 25, wherein said bellows is constructed from a relatively rigid material.

27. A flexible joint, as set forth in claim 25, wherein said bellows is constructed from a metallic material.

28. A method for assembling a flexible joint for sealingly coupling first and second tubular members while allowing limited articulated and axial movement therebetween, comprising the steps of:
   inserting first end portions of the first and second tubular members into a housing;
   coupling a bellows between the first end portions of the first and second tubular members to isolate the interior of said tubular members from the interior of the housing;
   capturing the first end portions of the first and second tubular members within the housing and elastically securing the first end portions to the housing via elastomeric bearings positioned thereabout;
   forming a sealed chamber between the interior of the housing and exterior the bellows; and
   filling the sealed chamber with a fluid.

29. A method, as set forth in claim 28, including the steps of:
   hydraulically coupling an accumulator to the sealed chamber.

30. A method, as set forth in claim 28, including the steps of:
   hydraulically coupling said annular chamber to the interior of said tubular members through a pressure balancing port.

31. A flexible joint for sealingly coupling first and second tubular members while allowing limited articulated and axial movement therebetween, comprising:

a housing adapted for receiving a first end portion of said first and second tubular members and retaining said first end portions therein;

an elastomeric bearing arrangement coupled between an interior surface of said housing and said first end portions of said tubular members, said elastomeric bearing arrangement being adapted for retaining said first end portions within said housing and permitting limited articulated and axial movement of said first and second tubular members; and a flexible membrane located within said housing and sealingly coupled between said first end portions of said first and second tubular members, said flexible membrane separating first and second sealed chambers;

said first sealed chamber being defined by interior surfaces of said first and second tubular members and said flexible membrane and being adapted for conveying a fluid therethrough;

said second sealed chamber being defined by an interior surface of said housing, an exterior surface of said flexible membrane, and said elastomeric bearing arrangement, said second chamber being adapted to receive a fluid therein whereby the fluid in the second chamber substantially matches the pressure of the fluid conveyed through the first chamber and produces a substantially zero pressure differential across said flexible membrane; and a pressure balancing assembly extending between said first and second sealed chambers and adapted for maintaining said first and second sealed chambers at substantially similar pressures.

32. A flexible joint, as set forth in claim 31, wherein said pressure balancing assembly includes a housing forming a port extending between said first and second sealed chambers, and a piston assembly positioned in said port and relatively free to move therein, said piston assembly having a first fluid engaging surface exposed to said first sealed chamber and a second fluid engaging surface exposed to said second sealed chamber, whereby a pressure differential between said first and second sealed chambers forces said piston assembly to move within said port and substantially eliminate the pressure differential.

33. A flexible joint, as set forth in claim 32, wherein said piston assembly includes a first piston exposed to said first sealed chamber, said first piston having an impermeable seal associated therewith to substantially prevent leakage of fluid from said first sealed chamber, and a second piston exposed to said second sealed chamber, said second piston having an elastomeric seal associated therewith to prevent leakage of fluid from said second sealed chamber.

* * * * *

UNITED STATES PATENT AND TRADEMARK OFFICE
CERTIFICATE OF CORRECTION

PATENT NO. : 5,133,578
DATED : July 28, 1992
INVENTOR(S) : Gary L. Whightsil. et al It is certified that error appears in the above-indentified patent and that said Letters Patent is hereby corrected as shown below:

Column 1, line 13, before " transmission", insert --for the--.

Column 12, line 26, before "fluid", insert -- fluid in the second chamber substantially matches the pressure of the --.

Signed and Sealed this

Fourteenth Day of September, 1993

*Attest:*

BRUCE LEHMAN

*Attesting Officer*   *Commissioner of Patents and Trademarks*